United States Patent Office 3,238,048
Patented Mar. 1, 1966

3,238,048
CERAMICS
Arthur V. Somers, Flushing, Mich., assignor to General Motors Corporation, Detroit, Mich., a corporation of Delaware
No Drawing. Filed Jan. 23, 1963, Ser. No. 253,255
10 Claims. (Cl. 106—39)

This invention relates to an improved ceramic and process for making same. It has particular utility for the manufacture of high strength industrial ceramics, electrical insulators and the like such as are made of alumina or similar single oxide or mixed oxide compositions.

For many types of industrial ceramics as well as for spark plug and other electrical insulators it is important to attain a body having optimum properties of mechanical strength, electrical resistance, thermal shock resistance and the like. Since many of these physical properties are a function of the density of the body, high density is highly desirable. Also it is advantageous that there be minimum shrinkage during firing in proceeding from the pressed powder prefired body to the dense sintered fired body. There will, of course, always be some shrinkage since this is inherent to the process of sintering. But the less the shrinkage the better for the reason that high shrinkage makes it difficult to attain the desired dimensions in the fired body. Of course the higher the compaction density of the prefired body, the less the shrinkage during firing.

A principal object of the present invention is the provision of an improved ceramic manufacturing process whereby ceramics of extremely high fired density can be accomplished. More specifically, it is an object of the present invention to provide a process whereby prefired ceramic compacts of high density can be manufactured such that upon firing there results, with relatively little shrinkage, a ceramic of exceptionally high density. Another object is the provision of an improved ceramic characterized by exceptionally high density with commensurate improvement in the various physical properties related to density.

The practice of the invention involves only three essential steps, though additional steps may be used if desired. The three essential steps are (1) grinding, (2) forming the ground ceramic into prefired powder compacts, and (3) firing to sinter the ceramic. Certain details of the grinding step are, however, extremely important. Briefly, I have discovered that if a small amount of an organic deflocculating agent is admixed with the ceramic batch and if the batch is then dry ground (i.e., grinding in substantially a dry state or with no more than about 1% uncombined water present with no more than about 6% organic material such that the batch is in a loose, pulverant state) using a large number of grinding balls such that the grinding ball weight-to-batch weight ratio is at least about 10-to-1, and preferably from 20-to-1 to 30-to-1, there results from such grinding operation a highly fluent, pulverant ceramic material which can be compressed into prefired bodies of exceptionally high density as compared with the usual density attained in prefired ceramic compacts. Hence when such a powdered compact is fired, there results, with relatively little shrinkage, a fired body of extremely high density and commensurate excellence in physical properties. While the precise reasons for the success of the process are not yet fully understood, it is believed that the presence of the organic deflocculating agent in combination with the high mill ball-to-batch ratio accomplishes an exceptionally good particle size and shape and particle size distribution in the ground batch. Further, the deflocculating agent serves in the nature of a lubricant in that it allows the grains to slip with respect to each other and hence facilitates tight compaction during pressing. These favorable grain characteristics apparently affect the amount of compaction attainable during pressing and also the density attainable in the sintered body during the firing step. But whatever the reasons the batch can be compacted to exceptionally high density with conventional pressures, on the order of 4,000 to 7,000 pounds per square inch and upon firing, an exceedingly high density ceramic body can be accomplished. Also, because the deflocculating agent provides the batch with a flowability comparable to that of a liquid the dry batch can be directly pressed into green compacts of uniform density thereby eliminating the necessity for steps intermediate grinding and pressing which have heretofore been necessary. As regards this simplified processing technique reference is made to my copending United States patents, Serial Numbers 253,256, 253,257 and 253,258, which were filed on January 23, 1963.

The above and other features and advantages of the invention will appear more clearly from the following detailed discussion of particulars of preferred embodiments.

*Ceramic raw batch for the grinding operation*

The ceramic material selected for the raw batch will, of course, depend upon the type of ceramic ware desired, it being understood that the invention is not restricted to the use of any particular ceramic materials. For high strength industrial ceramics and electrical insulators, the batch can, for example, consist of a mixture predominantly of aluminum oxide together with small amounts of fluxing ingredients such as talc, calcium carbonate, clay and the like. Such alumina base compositions are well known in the art, as evidenced by United States Patent 2,760,875, and are currently preferred for the production of relatively inexpensive, high density bodies. If extremely high thermal conductivity is desired as is the case for certain specialized ceramic products, beryllium oxide is preferable to aluminum oxide though it is more expensive. Typical body compositions of this type, all of which can be used in the present invention are:

90% aluminum oxide,
6% clay,
2% calcia,
2% magnesia;

94% aluminum oxide,
4% clay,
1% strontium carbonate,
1% talc;

98% aluminum oxide,
1.5% silica,
.5% calcium carbonate;

97% beryllium oxide,
2% silica,
1% magnesia.

Any of the other fluxing ingredients or mineralizers well known in the art, for example, chromium oxide, manganese oxide, barium oxide, etc., may, of course, be used in place of or in addition to the various fluxes specified in the above compositions.

As exemplified by the above, practically all ceramic compositions currently used for the production of industrial ceramics and spark plug and other electrical insulators include glass-forming flux ingredients. Hence the resulting fired body consists of a sintered mass of aluminum oxide or beryllium oxide crystals with interstitial glass filling the voids between the crystals. It is by reason of the interstitial glass that nonporosity and therefore relatively high density is attained by present conventional processing techniques. Using such techniques, alumina base bodies having a density on the order of 3.7 to 3.8 or slightly higher can be attained. But while the glass is useful in that it promotes nonporosity, it detracts from the ceramic in various other respects. For example, in a spark plug insulator it is the interstitial glass that is most subject to attack by lead salts resulting from the burning of leaded fuel. It has been established that other physical and chemical properties also suffer because of the presence of the glass phase. Hence, for optimum physical and chemical characteristics the ideal ceramic body is one which has high density but with substantially no glass phase. As indicated previously, the method of this invention has the specified advantage of being capable of producing extremely high density ceramics by reason of the favorable grain characteristics resulting from the grinding step. Because of this, a glass phase is not necessary to the attainment of nonporosity and high density. Hence the raw batch can consist of a single oxide or a mixture of oxides which is substantially free of all glass-forming ingredients such as silica as such or in any of its combined forms. Typical examples of such a batch are:

100% aluminum oxide;

100% beryllium oxide;

99.75% aluminum oxide,
0.25% magnesium oxide (added as such or as magnesium sulfate or magnesium nitrate);

99.25% aluminum oxide,
0.25% magnesium oxide (added as such or as magnesium sulfate or magnesium nitrate),
0.5% chromium oxide.

High alumina bodies with densities on the order of 3.9 and higher can be accomplished with the practice of this invention. For example, using the latter formula immediately above and with the magnesia added as the nitrate or sulfate, I have produced by the practice of the invention ceramic ware of exceptionally high quality with a density on the order of 3.95. This ceramic ware so manufactured had a relatively high degree of transparency as compared with the almost completely opaque chalk-like texture of conventional high alumina bodies.

Where aluminum oxide is the principal ingredient in the raw batch as should preferably be the case where the method is used to produce relatively low cost industrial ceramics or spark plug or other electrical insulators, it is desirable that the aluminum oxide be a substantially soda-free and silica-free calcined alumina of small crystal size. Such aluminas are common in the market.

*Nonceramic raw batch ingredients*

In addition to the ceramic materials, the raw batch for the grinding operation must also include a small amount, up to about 6% by weight, of an organic defluocculating agent. By the term "deflocculating agent" I mean an organic material which serves as a nonagglomerator and lubricant and which therefore inhibits any sticking of the grains one to the other during grinding thereby preventing any packing in the grinding mill and providing the batch with a flowability comparable to that of a liquid during the grinding operation. Preferred as the deflocculating agents are the organic wetting agents commonly sold for the preparation of emulsions or for similar uses as nonagglomerants. Eminently satisfactory, for example, are sodium ligno sulfonate either alone or in mixture with wood sugar, ammonium ligno sulfonate. Other examples are the sodium salts of the alkyl aryl polyether sulfates and the sodium salts of the alkyl aryl sulfonic acids. Other organic deflocculating agents desirable for the practice of the invention are: the salts and esters of the organic fatty acids, for example hydrogenated castor oil or cottonseed oil, diglycol monolaurate, diglycol di- laurate, polyethylene glycol monolaurate, aluminum stearate, aluminum hydroxy stearate; ethylene or propylene glycol and the low molecular weight polymers thereof, for example, polyethylene glycol mol. wt. 400. Also suitable though not as good are dextrin and triethanolamine. Combinations of two or more deflocculating agents may be used to advantage. For example, I have found the combination of sodium ligno sulfonate and hydrogenated cottonseed oil or hydrogenated castor oil to be excellent. As indicated previously, the use of the deflocculating agent also allows considerable process simplification and in this regard reference is made to my aforementioned copending United States patent applications filed concurrently herewith.

It is often desirable that the batch also include a small amount up to about 6% by weight of an organic binder material such that the prefired articles resulting from the pressing operation have sufficient mechanical strength to withstand a considerable amount of shock during handling operations between forming and firing.

To attain minimum shrinkage during firing and also for reasons of economy it is, of course, desirable to use as little organic material in the batch as is necessary to accomplish the desired batch properties. Hence, whereas larger amounts of deflocculating agent and binder can be included in the batch, it is preferred that the total percentage of organic material, including both deflocculating agent and binder, not exceed about 6%. Generally about 2% by weight deflocculating agent is ample to provide the anti-agglomerating and flowability properties required and about 2% by weight binder is sufficient for excellent green strength.

*The grinding operation*

The grinding operation can be performed in a conventional ball mill preferably either rubber lined or lined with a ceramic material having a composition similar to that being manufactured in order to avoid adverse contamination. In this same vein, it is preferred that the mill balls be of a dense ceramic having a composition the same or similar to the ceramic being manufactured. Conventional size mill balls, having an initial diameter of about one to four inches, are quite satisfactory for milling production size batches. There is, of course, mill ball wear during the grinding though I have found that the amount of wear is considerably less in the practice of the present invention than in conventional wet milling operations.

The ceramic ingredients in the desired proportions along with the deflocculating agent and an organic binder, if necessary, are placed in the mill along with mill balls in sufficient number that the mill ball-to-batch weight ratio is at least about 10-to-1 and preferably about 20-to-1 to 30-to-1. The batch is then dry ground until mixing is completed and the desired extent of particle size reduction is accomplished. A grinding time of 4 to 5 hours is generally sufficient for compositions containing up to about 95% alumina together with siliceous or other glass-forming materials. For higher alumina bodies containing little or no glass-forming constituents, grinding times of 10 to 30 hours are desirable. The ground raw batch can then be immediately passed to the pressing operation to produce shaped, self-sustaining, prefired articles.

For a high alumina batch, particularly one containing little or no glass-forming ingredients, the particle size distribution of the alumina at the conclusion of the grinding operation should preferably be on the order of:

| Percent | Microns |
|---|---|
| 5 to 15 | 5 to 10 |
| 50 to 70 | 1 to 5 |
| At least 25 | Less than 1 |

Hence, the batch is characterized by its high proportion of extremely fine particles and its lower proportion of comparatively coarse particles. The average alumina particle size in a typical such batch was found to be on the order of 2.3 to 2.5 microns. Further examination and measurements of the particles indicate very high specific surface areas and considerable variation in particle shape, the relatively coarse particles being sharply angular and the smaller particles being subrounded to rounded.

Forming operation

The desired prefired articles can be pressed directly from the particulate material from the grinding operation preferably by pressing in matched metal dies or by isostatically molding with rubber molds substantially the same as those used in the so-called spray drying-isostatic molding process presently in wide commercial use. Such process is disclosed in United States Patent 2,251,454. Because of the fluent nature of the particulate material, it fills the die or mold easily, much as would a liquid, and on the application of pressure extremely uniform high density can be accomplished in the prefired article. Pressures on the order of 4,000 to 7,000 pounds per square inch are quite satisfactory to produce the desired results. Exceptionally high compaction, to densities on the order of 2.4 to 2.7, can be accomplished in the prefired articles with pressures of such magnitude.

Even though the ceramic batch material prior to pressing has a high degree of fluidity due to the presence of the deflocculating agent, the prefired articles resulting from the forming operation are self-sustaining and have ample green strength to withstand the normal handling operations between forming and firing. As indicated previously a binder, preferably paraffin wax, should be used if the deflocculating agent does not provide the amount of green strength desired in the prefired articles. For the manufacture of ceramic articles of relatively simple shape such as cylinders or discs, the use of matched steel dies serves eminently well and is recommended for the forming operation. However, where the shapes desired are relatively complex, for example, spark plug insulators, the use of rubber molds is much preferred.

While it is preferred, for low cost manufacture, that the prefired articles be pressed directly from the ground batch material, the use of this simplified processing is not essential to the practice of the present invention. For example, the batch can be ground in admixture only with a deflocculating agent, paraffin wax binder being subsequently added by a separate operation. The conventional manner of adding the wax is to mix the batch with a wax-water emulsion in a blunging operation to form a slurry after which the slurry is screened and then sprayed into a hot air dry tower to cause the water to evaporate. This technique, which is taught in the aforementioned United States Patent 2,251,454, results in a flowable mass of wax bonded ceramic globules suitable for pressing into the prefired articles of uniform density.

Firing operation

The firing temperature and schedule used to sinter the articles from the forming operation will, of course, depend on the ceramic ingredients used. However, for any composition, the firing temperature can be about 100° to 200° F. less than that which would be used were the same composition made by conventional processes. For example, for high alumina bodies which contain upwards of 95% aluminum oxide together with small amounts of glass-forming fluxes and which conventionally require a firing temperature of about 2900° F., a firing temperature of about 2700° F. on a six-hour schedule is satisfactory to cause sintering to a dense, nonporous body. For a 100% alumina body or one otherwise not containing any glass-forming fluxes a firing temperature of about 2900° to 3100° F. is satisfactory, as will be evident from the following example:

A ceramic raw batch was formed by adding to a conventional ball mill granular fused aluminum oxide 99.25%, granular magnesium oxide 0.25% and chromuim oxide 0.5% (by weight). Then dry powdered ammonium ligno sulfonate in an amount equal to about 2% the weight of the ceramic batch and dry powdered paraffin wax also in an amount equal to about 2% the weight of the ceramic batch were additionally added to the mill. The mixture was milled for 20 hours using 1" to 1½" diameter alumina grinding balls in a ratio of about 30 pounds of balls to each pound of batch. At the conclusion of this grinding operation the fluent ceramic batch was pressed in matched steel dies with a pressure of 5,000 pounds per square inch to form self-sustaining cylindrical shaped compacts. The cylinders were then fired at 3050° F. on a six-hour schedule, the maximum temperature being held for about one hour at the middle of the schedule. The resulting nonpourous sintered bodies had a density of 3.93 the firing operation being characterized by the unusually low shrinkage from the prefired compact to the fired articles.

While the invention has been described in detail with reference to certain embodiments thereof, changes may be made, all within the full and intended scope of the claims which follow.

I claim:

1. In a process for manufacturing ceramics, the step of dry grinding in a ball mill a particulate ceramic batch in admixture with a small but effective amount of an organic material having defloccuant and binder properties, said material having sufficient defluocculating ability to prevent packing in the ball mill and sufficient binding ability to afford green strength for a compacted ceramic article, the weight ratio of grinding balls to batch being at least 10 to 1 to produce a high density, free flowing, finely divided ceramic powder.

2. In a process for manufacturing ground ceramic particles suitable for compacting and sintering, the step of dry grinding in a ball mill a particulate ceramic batch in admixture with a small but effective amount of an organic material having defloccuant and binder properties, said material having sufficient defloccuating ability to prevent packing in a ball mill and sufficient binding ability to afford green strength for a compacted ceramic article, the weight ratio of grinding balls to batch being at least 10 to 1 to produce a high density, free flowing, finely divided ceramic powder.

3. A process as set forth in claim 1 wherein the weight ratio of grinding balls to ceramic batch is from 20 to 1 to 30 to 1.

4. A process as set forth in claim 1 wherein the amount of material ranges from a small but effective amount up to 6.0 weight percent.

5. A process as set forth in claim 1 wherein said material consisting essentially of a mixture of paraffin wax and a quantity of an organic compound having sufficient defluocculating ability to prevent packing in the ball mill.

6. In a process for manufacturing ceramics, the steps of dry grinding in a ball mill a particulate ceramic batch in admixture with a small but effective amount of an organic material having defloccuant and binder properties, said material having sufficient defloccuating ability to prevent packing in a ball mill and sufficient binding ability to afford green strength for a compacted ceramic article, the weight ratio of grinding balls to ceramic batch being at least 10 to 1 to produce a high density, free flowing, finely divided ceramic powder, subsequently pressing the ceramic material from said grinding step to form a compacted article of uniform density, and then firing said articles to form the dense, nonporous, sintered ceramic body.

7. A process as set forth in claim 6 wherein the amount of material is from a small but effective amount up to 6.0 weight percent.

8. A process according to claim 6 in which said material consisting essentially of a mixture of paraffin wax and a quantity of an organic compound having sufficient deflocculating ability to prevent packing in the ball mill.

9. Ceramic particles useful for the manufacture of dense, nonporous, fired ceramic bodies, said ceramic particles consisting predominantly of alumina particles coated with an organic material having deflocculant and binder properties, said material providing sufficient deflocculating ability to prevent packing in a ball mill and sufficient binding ability to afford green strength for a compacted ceramic article, the particle size distribution of said ceramic particles being approximately:

| Percent (by weight): | Microns |
|---|---|
| 5 to 15 | 5 to 10 |
| 50 to 70 | 1 to 5 |
| At least 25 | Less than 1 |

10. Ceramic particles useful for the manufacture of dense, nonporous, fired ceramic bodies, said ceramic particles consisting predominantly of alumina particles coated with an organic material having deflocculant and binder properties, said material having sufficient deflocculating ability to prevent packing in a ball mill and sufficient binding ability to afford green strength for a compacted ceramic article, said material comprising some paraffin wax, the particle size distribution of said ceramic particles being approximately:

| Percent (by weight): | Microns |
|---|---|
| 5 to 15 | 5 to 10 |
| 50 to 70 | 1 to 5 |
| At least 25 | Less than 1 |

References Cited by the Examiner
UNITED STATES PATENTS

| | | | |
|---|---|---|---|
| 1,847,196 | 3/1932 | Scott | 264—63 |
| 1,985,076 | 12/1934 | Breyer | 241—16 |
| 2,225,147 | 12/1940 | Bechtold | 241—16 |
| 2,382,136 | 8/1945 | Crowley et al. | 264—63 |
| 2,603,837 | 7/1952 | LeCuir | 264—63 |
| 2,694,245 | 11/1954 | Rogers et al. | 264—63 |
| 2,939,199 | 6/1960 | Strivens | 264—63 |
| 2,947,056 | 8/1960 | Csordas et al. | 106—65 |
| 2,968,551 | 1/1961 | North et al. | 264—63 |
| 3,026,210 | 3/1962 | Coble | 106—65 |
| 3,051,566 | 8/1962 | Schwartz | 264—63 |

TOBIAS E. LEVOW, *Primary Examiner.*